United States Patent [19]

Tsuruta et al.

[11] Patent Number: 4,908,924
[45] Date of Patent: Mar. 20, 1990

[54] PROCESS FOR PRODUCING A PART OF TORQUE CONVERTER

[75] Inventors: Kiyoyuki Tsuruta, Okazaki; Kenji Maseki, Chiryu, both of Japan

[73] Assignee: Aisin-Aw Kabushiki Kaisha, Japan

[21] Appl. No.: 224,358

[22] Filed: Jul. 26, 1988

[30] Foreign Application Priority Data

Dec. 28, 1987 [JP] Japan .................................. 62-329501

[51] Int. Cl.⁴ ............................................. B23P 15/00
[52] U.S. Cl. ........................................ 29/888; 29/557; 29/889
[58] Field of Search ................... 29/156.4 R, 557, 558; 192/3.29, 106.2

[56] References Cited

U.S. PATENT DOCUMENTS

| | | | |
|---|---|---|---|
| 4,399,845 | 8/1983 | Kubo et al. | 192/3.29 |
| 4,735,297 | 4/1988 | Koshima | 192/3.29 |
| 4,785,924 | 11/1988 | Jäckel | 192/3.29 |
| 4,821,855 | 4/1989 | Jäckel | 192/3.29 |

*Primary Examiner*—Timothy V. Eley
*Attorney, Agent, or Firm*—Lorusso & Loud

[57] ABSTRACT

A torque converter part having a three dimensional configuration and adapted to be assembled together with a series of torque converter pump blades is formed by a process which includes forming, within a press, slits, for receiving ends of the blades, in a flat blank within a press, deburring, within the press, to remove the burrs formed during slitting, so as to form half-finished work. The half-finished work is cut from the blank and deep drawn thereby obtaining a toroidal torque converter part. Since the deburring is conducted on the work while the work is still flat, burrs are removed easily and promptly with a high degree of uniformity.

9 Claims, 5 Drawing Sheets

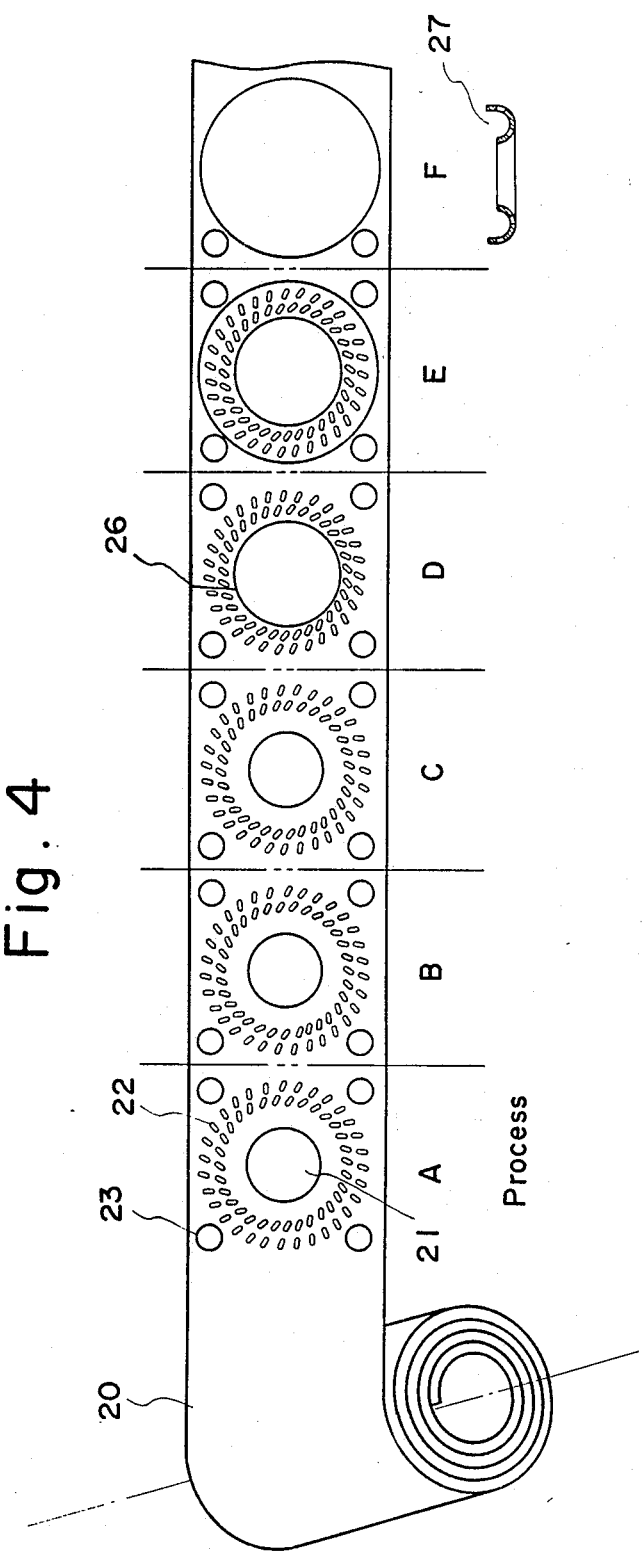

PROCESS FOR PRODUCING A PART OF TORQUE CONVERTER

BACKGROUND OF THE INVENTION

The present invention relates to a process for producing a part of a torque converter and, more particularly, to a process for forming a torque converter part having slits, such as an inner core or an outer shell of a torque converter.

FIG. 1 illustrates a portion of a conventional torque converter, particularly an inner core and an outer shell of the torque converter. As will be seen from this FIG., the torque converter has an inner core 1, an outer shell 2 and a circumferential row of blades 3 interposed between the inner core 1 and the outer shell 2. The inner core 1 and the outer shell 2, therefore, have toroidal form with the inner core, having slits formed therein for the purpose of receiving the blades 3. FIG. 2 is a perspective view of the inner core 1 and the blades 3 which are assembled together. The inner core 1 has slits 5 which receive fixing tabs 4 on one end of the blades 3. The tabs 4 are folded onto the inner core 1 so that the blades 3 are fixed to the inner core 1.

Conventionally, the slits in the inner core and the outer shell have been formed in a manner which will be explained below with specific reference to FIG. 3.

A metal sheet 10 as a blank is prepared and is punched as shown in FIG. 3(a) and the peripheral portion of the hole formed by punching is removed as shown in FIG. 3(b) whereby a work product 11 as shown in FIG. 3(c) is obtained. The work product 11 is then subjected to deep drawing or spinning so that a toroidal inner core 12 is obtained as shown in FIG. 3(d).

Slitting is then effected on the inner core 12 by a press on the toroidal inner core 12 as shown in FIG. 3(e). After the In slitting, burrs 14 are inevitably formed on the punch-exit side of the inner core 12. In other to remove these burrs, therefore, it has been necessary to conduct deburring pressing by a suitable tool so as to flatten the portions of the inner surface of the inner core 12 as shown in FIG. 3(f). Thus, the inner core and the outer shell of the torque converter have toroidal forms, and slits for mounting the blades have to be formed in such toroidal structures with the result that burrs are left on the inner surface of the inner core or the outer shell. These burrs, if left unremoved, will form metal chips which will undesirably be introduced into the hydraulic circuit of the transmission so as to cause troubles such as sticking of a valve. Processing by press on a surface having three-dimensional curvatures, as is the case of the deburring pressing operation in FIG. 3(f), encounters a problem in that the pressing tool may fail to closely and uniformly contact the surface to be pressed. In consequence, the deburring process shown in FIG. 3(f) may result in a non-uniform removal of the burrs. Thus, the pressing of a surface having three dimensional curvatures is difficult to conduct. The pressing of a surface having three dimensional curvatures also encounters a problem in regard to difficulty in precisely holding the die which cooperates with the pressing tool.

In order to obviate these problems, a high degree of skill or experience has been required, as well as a long processing time.

SUMMARY OF THE INVENTION

Accordingly, an object of the present invention is to provide a process for producing a torque converter part having slits for receiving and fixing blades, wherein the slits are formed by a press in a flat blank of the part followed by a deburring pressing conducted in a press die, whereby a work having slits without burrs is obtained. The work is then taken out of the press and is subjected to a deep drawing so that a toroidal torque converter part having three-dimensional curvatures is obtained. The process according to the invention having the described features offers the following advantages.

(1) The deburring of a torque converter part such as an inner core or an outer shell can be executed easily and promptly within a flat press, thus contributing to stabilization of the quality.

(2) Troubles are avoided such as valve sticking in the hydraulic transmission circuit attributable to inclusion of metal dust or chips from burrs.

(3) Efficiency of assembly of the torque converter can be improved by virtue of the fact that the blades can be smoothly inserted into slits which have no burr. In consequence, the production efficiency is improved to reduce the production cost.

The above and other objects, features and advantages of the present invention will become clear from the following description when the same is read in conjunction with the accompanying drawings.

BRIEF DESCRIPTION OF THE DRAWINGS

FIG. 4 is an illustration of a first embodiment of a process of the invention for producing a torque converter part;

DESCRIPTION OF THE PREFERRED EMBODIMENTS

Preferred embodiments of the present invention will be described hereinunder with reference to the accompanying drawings.

FIG. 4 illustrates a process for producing an inner core of a torque converter by means of progressive dies. More specifically, the process has the following steps. As a first step, a metal sheet such as an iron sheet 20 as a blank sheet is uncoiled. Then, in Step A, punching of a central hole 21, slitting for forming slits 22 and punching of four pilot holes 23 at corners are simultaneously effected in one shot. By virtue of this simultaneous formation of the central hole 21, slits 22 and four pilot holes 23, these holes and slits are precisely located. The pilot holes 23 serve to correctly locate the work in the subsequent steps such as the deburring pressing step (Step B), trimming of the inner periphery (Step D), and cutting at the outer periphery (Step E).

Figure 1:
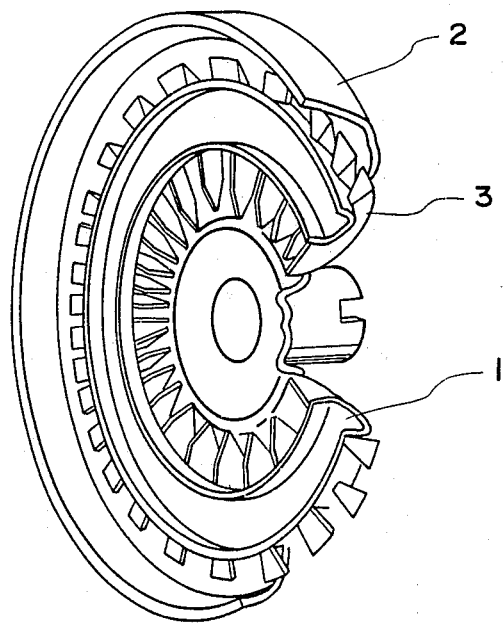
FIG. 1 is a fragmentary perspective view of a pump incorporated in a torque converter.
Figure 2:
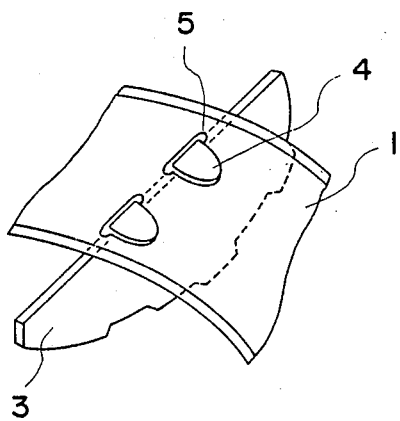
FIG. 2 is an illustration of the manner in which an inner core and blades of a torque converter are assembled together.
Figure 3:
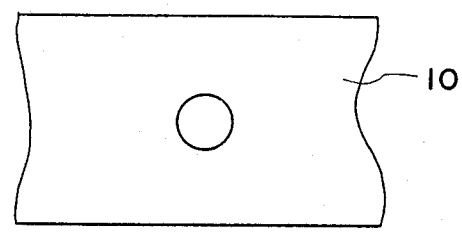
FIG. 3 is an illustration of the process for producing an inner core of a conventional torque converter.
Figure 3:
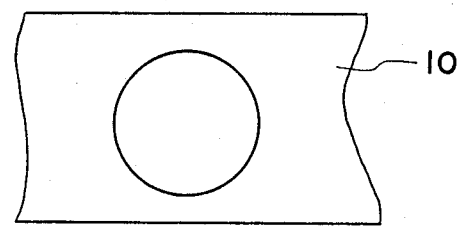
Figure 3:
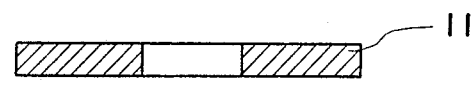
Figure 3:
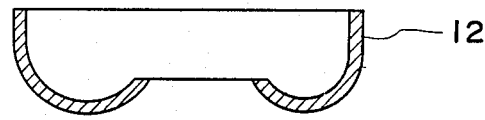
Figure 3:
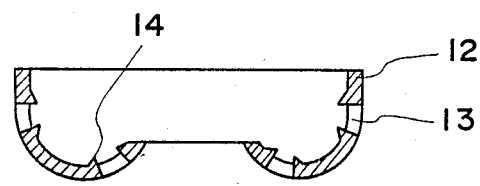
Figure 3:
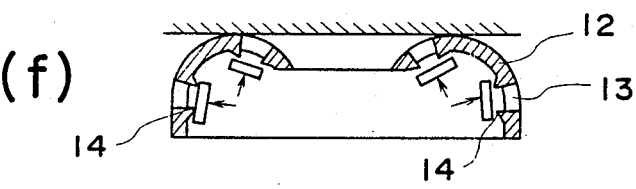
Figure 5A:
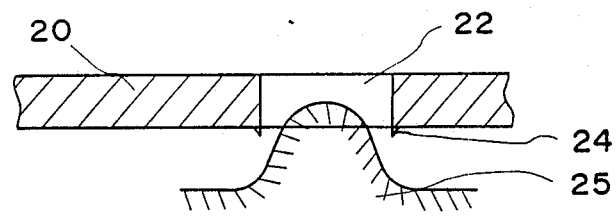
FIG. 5 is a sectional view illustrating the deburring step in the process for the present invention.
Figure 5B:
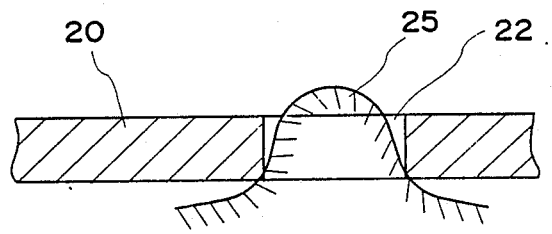

The work obtained in Step A still has burrs along the slits 22. A deburring is therefore effected in Step B by pressing the surface. FIGS. 5(a) and 5(b) show the manner in which the deburring is conducted. A burr 24 appears on the lower edge of the slit 22 formed in the iron sheet 20 as the work. A lower die 25 is moved into the slit 22 from the lower side so as to press the surface of the work 20 thereby removing the burr 24 as shown in FIG. 5(b).

Although only slit is shown in FIGS. 5(a) and 5(b), it will be clear to those skilled in the art that the same deburring operation is conducted simultaneously on all the slits 22 formed in the work 20. Since there are a lot of slits, e.g., 62 slits (two rows each including 31 slits), it is necessary to precisely locate all the lower dies 25 with respect to these slits 22. In this embodiment, this can be accomplished without difficulty by virtue of the central hole 21 and four pilot holes 23.

A Step C is an idle step in which no processing is conducted. This idle step C provides a space margin which affords such as arrangement that a die assembly used in Steps A and B and die assembly used in Steps C and D are mounted on a single base which enables both die assemblies to operate simultaneously.

The trimming of the inner periphery conducted in Step D also makes use of the hole 21 and the pilot holes 23 as the locating means, so that a hole 26 defining the inner peripheral edge of the torque converter inner core is formed. A slight deformation of the work 20 may occur during the formation of the central hole 21 and slits 22 in Step A, as well as in the course of the deburring conducted in Step B. However, since the trimming of the inner peripheral edge of the torque converter inner core is executed with reference to the pilot holes 23 after these steps A and B, the hole defining the inner peripheral edge of the inner core can be precisely located with respect to the work. The cutting of the outer periphery is executed in Step E. In this step also, the hole 26 defining the inner peripheral edge and the pilot holes 23 effectively serve as locating means so that the inner peripheral edge and the outer peripheral edge of the inner core are made precisely concentric, whereby an annular flat work with slits formed therein can be obtained.

The thus formed work is then subjected to deep drawing conducted in Step F, so that a toroidal inner core 27 for a torque converter is obtained.

Figure 6:
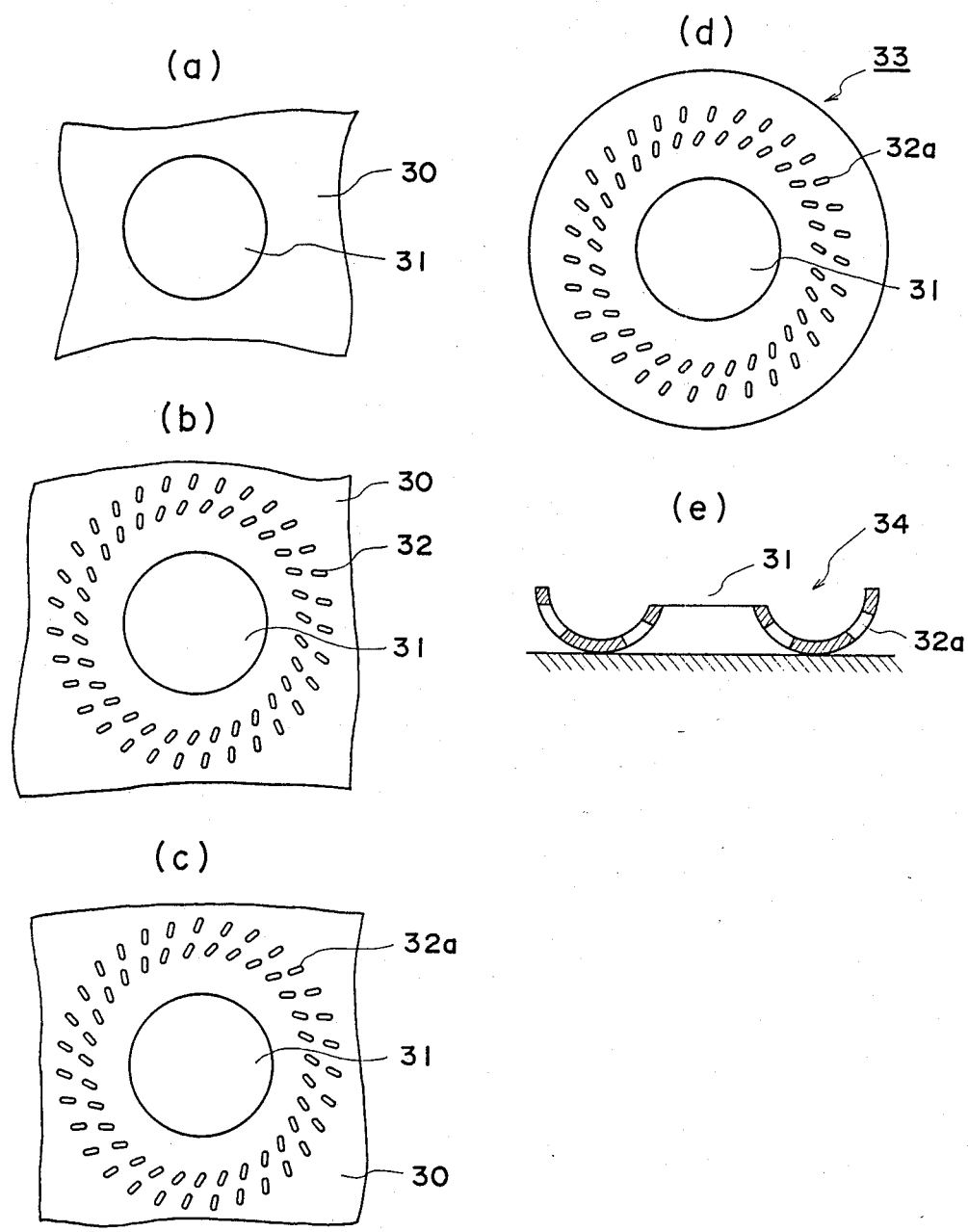
FIG. 6 is an illustration of a second embodiment of a process of the invention for producing a torque converter part.

A second embodiment of the process according to the invention for producing a torque converter part will be described with reference to FIG. 6.

A metal sheet 30 as a blank or work is prepared and is processed by progressive die apparatus so that a central hole defining the inner peripheral edge of the product is formed as shown in FIG. 6(a). Then, slits 32 are formed around the hole 31 formed in the work 30 by press punching conducted in the progressive dies, as shown in FIG. 6(b). Then, deburring pressing is effected on the flat work with slits 32 within the progressive dies as shown in FIG. 6(c), so that the burrs which were formed on the lower edges of slits during the slit-forming press punching are removed, whereaby slits 32a with no burrs are obtained.

Subsequently, cutting of the outer periphery is conducted in the progressive dies in the manner shown in FIG. 6(d), whereby an annular flat work 33 with slits 32a is obtained as shown in FIG. 6(d).

The thus obtained annular work 33 is then subjected to deep drawing, whereby a toroidal torque converter inner core 34 is formed as shown in FIG. 6(e).

As will be understood from the foregoing description, according to the present invention, the deburring can be conducted uniformly and easily because the deburring pressing is effected while the blank is still flat. This eliminates the problems encountered with the conventional process in which deburring pressing is executed on three-dimensionally curved toroidal work, i.e., time-consuming and difficult operation for uniformly and accurately positioning the deburring tools or dies. Thus, the process of the present invention provides faster easier deburring as compared with the conventional process.

Figure 7:
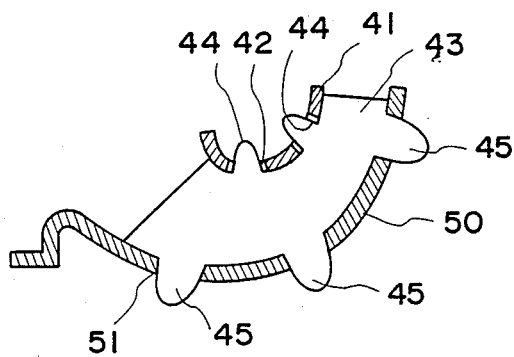
FIG. 7 is a fragmentary sectional view illustrating the process of assembling the torque converter part.
Figure 8:
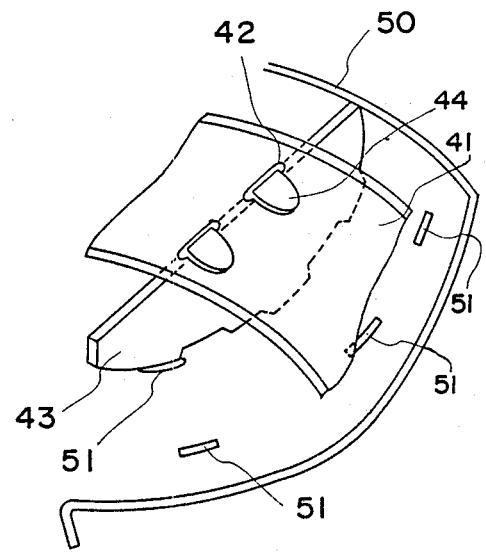
FIG. 8 is a partial perspective view illustrating the torque converter part in an assembled state.

Although the process of the invention has been described with specific reference to an inner core as a torque converter part, the process of the present invention can equally be applied to the production of an outer shell of a torque converter which has a configuration substantially the same as the inner core and which cooperates with the inner core in forming a torque converter pump. Namely, as shown in FIGS. 7 and 8, an outer shell 50 is adapted to be disposed around the inner core 41 with pump blades 43 interposed therebetween. The outer shell 50 also has been provided with slits 51 which were formed in the same manner as the slits in the inner core 41. The pump assembly process is as follows. Fixing tabs 44 projecting from one end of the blade 43 are inserted into the slits 42 of the torque converter inner core 41 while fixing tabs 45 formed on the other ends of the blade 43 are inserted into the slits 51 formed in the outer shell 50. These tabs 44 and 45 are folded onto the respective members 41 and 50 so as to fix these blades, thus completing assembly of the torque converter pump.

Although the invention has been described through specific terms, it is to be noted that the described embodiments are only illustrative and various changes and modifications may be imparted thereto without departing from the scope of the invention which is limited solely by the appended claims.

What is claimed is:

1. A process for producing a toroidal torque converter part having a three-dimensional configuration and adapted to be assembled together with blades having tabs at each end, said process comprising:
    (a) forming slits, for receiving the tabs of said blades, in a flat blank within a press to form a flat slitted workpiece;
    (b) deburring said slits while said flat workpiece is within said press;
    (c) severing said slitted workpiece from said blank within said press; and
    (d) deep drawing said severed workpiece to form the toroidal torque converter part.

2. A process for producing a toroidal torque converter part having a three-dimensional configuration and adapted to be assembled together with blades having tabs at each end, said process comprising:
    (a) forming a central locating hole, slits and corner pilot holes in a flat blank within a press to form a flat slitted workpiece;
    (b) deburring, within said press, said slits in said flat workpiece by making use of said central locating hole and said pilot holes as position reference;

(c) trimming, within said press, the inner periphery of said central hole to define the inner peripheral edge of said torque converter part by making use of said central locating hole and said pilot holes as position reference;
(d) cutting, within said press, said flat workpiece along a line which defines the outer peripheral edge of said torque converter part, so as to obtain a half-finished flat work; and
(e) deep drawing said half-finished flat work thereby forming the toroidal torque converter part.

3. A process for producing a toroidal torque converter part having a three-dimensional configuration and adapted to be assembled together with blades having tabs at each end, said process comprising:
(a) punching a flat blank within a press so as to form a hole which defines the inner peripheral edge of said torque converter part;
(b) forming slits around said hole in said punched blank within said press to form a flat slitted workpiece;
(c) deburring said slits in said flat workpiece within said press;
(d) cutting said flat slitted workpiece along a line which defines the outer peripheral edge of said torque converter part within said press to produce a halffinished flat work; and
(e) deep drawing said half-finished flat work thereby forming the toroidal torque converter part.

4. A process for producing a toroidal inner core of a torque converter having a three-dimensional configuration and adapted to be assembled together with blades having tabs at each end, said process comprising:
(a) forming slits, for receiving the tabs of said blades, in a flat blank within a press to form a flat slitted workpiece;
(b) deburring said slits while said flat workpiece is within said press;
(c) severing said slitted workpiece from said blank within said press; and
(d) deep drawing said severed workpiece to form the toroidal inner core of the torque converter.

5. A process for producing a toroidal inner core of a torque converter having a three-dimensional configuration and adapted to be assembled together with blades having tabs at each end, said process comprising:
(a) forming a central locating hole, slits and corner pilot holes in a flat blank within a press to form a flat slitted workpiece;
(b) deburring, within said press, said slits in said flat workpiece by making use of said central locating hole and said pilot holes as position reference;
(c) trimming, within said press, the inner periphery of said central hole to define the inner peripheral edge of said torque converter part by making use of said central locating hole and said pilot holes as position reference;
(d) cutting, within said press, said flat workpiece along a line which defines the outer peripheral edge of said torque converter part, so as to obtain a half-finished flat work; and
(e) deep drawing said half-finished flat work thereby forming the toroidal inner core of the torque converter.

6. A process for producing a toroidal inner core of a torque converter having a three-dimensional configuration and adapted to be assembled together with blades having tabs at each end said process comprising:
(a) punching a flat blank within a press so as to form a hole which defines the inner peripheral edge of said torque converter part;
(b) forming slits around said hole in said punched blank within said press to form a flat slitted workpiece;
(c) deburring said slits in said flat workpiece within said press;
(d) cutting said flat slitted workpiece along a line which defines the outer peripheral edge of said torque converter part within said press to produce a halffinished flat work; and
(e) deep drawing said half-finished flat work thereby forming the toroidal inner core of the torque converter.

7. A process for producing a toroidal outer shell of the torque converter having a three-dimensional configuration and adapted to be assembled together with blades having tabs at each end, said process comprising:
(a) forming slits, for receiving the tabs of said blades, in a flat work within a press to form a flat slitted workpiece;
(b) deburring said slits while said flat workpiece is within said press;
(c) severing said slitted workpiece from said blank within said press; and
(d) deep drawing said severed workpiece to form the toroidal outer shell of the torque converter.

8. A process for producing a toroidal outer shell of a torque converter having a three-dimensional configuration and adapted to be assembled together with blades having tabs at each end, said process comprising:
(a) forming a central locating hole, slits and corner pilot holes in a flat blank within a press to form a flat slitted workpiece;
(b) deburring, within said press, said slits in said flat workpiece by making use of said central locating hole and said pilot holes as position reference;
(c) trimming, within said press, the inner periphery of said central hole to define the inner peripheral edge of said torque converter by making use of said central locating hole and said pilot holes as position reference;
(d) cutting, within said press, said flat workpiece along a line which defines the outer peripheral edge of said torque converter part, so as to obtain a half-finished flat work; and
(e) deep drawing said half-finished flat work thereby forming the toroidal outer shell of the torque converter.

9. A process for producing a toroidal outer shell of a torque converter having a threedimensional configuration and adapted to be assembled together with blades having tabs at each end, said process comprising:
(a) punching a flat blank within a press so as to form a hole which defines the inner peripheral edge of said torque converter part;
(b) forming slits around said hole in said punched blank within said press to form a flat slitted workpiece;
(c) deburring said slits in said flat workpiece within said press;
(d) cutting said flat slitted workpiece along a line which defines the outer peripheral edge of said torque converter part within said press to produce a half-finished flat work; and
(e) deep drawing said work thereby forming the toroidal outer shell of the torque converter.

* * * * *

UNITED STATES PATENT AND TRADEMARK OFFICE
CERTIFICATE OF CORRECTION

PATENT NO.  : 4,908,924
DATED       : March 20, 1990
INVENTOR(S) : TSURUTA et al It is certified that error appears in the above-identified patent and that said Letters Patent is hereby corrected as shown below:

Col. 3, line 13, after "only" insert --one--;
      line 24, "as" should read --an--.

Col. 4, line 33, "ends" should read --end--.

IN THE CLAIMS:

Col. 5, line 27, "halffinished" should read --half-finished--.

Col. 6, line 12, "halffinished" should read --half-finished--;
      line 40, after "converter" insert --part--; and
      line 51, "threedimensional" should read --three-dimensional--.

Signed and Sealed this

Fourth Day of June, 1991

*Attest:*

HARRY F. MANBECK, JR.

*Attesting Officer*  *Commissioner of Patents and Trademarks*